United States Patent
Wang et al.

(10) Patent No.: US 11,913,518 B2
(45) Date of Patent: Feb. 27, 2024

(54) CENTRIFUGAL PENDULUM, TORQUE TRANSMITTING DEVICE INCLUDING THE CENTRIFUGAL PENDULUM AND VEHICLE

(71) Applicant: VALEO KAPEC TORQUE CONVERTERS (NANJING) CO., LTD., Nanjing (CN)

(72) Inventors: Shengzhang Wang, Nanjing (CN); Xun Hu, Nanjing (CN); Maohui Li, Nanjing (CN); Ying Yin, Nanjing (CN)

(73) Assignee: VALEO KAPEC TORQUE CONVERTERS (NANJING) CO., LTD., Nanjing (CN)

( * ) Notice: Subject to any disclaimer, the term of this patent is extended or adjusted under 35 U.S.C. 154(b) by 145 days.

(21) Appl. No.: 17/633,853

(22) PCT Filed: Aug. 7, 2020

(86) PCT No.: PCT/CN2020/107870
§ 371 (c)(1),
(2) Date: Feb. 8, 2022

(87) PCT Pub. No.: WO2021/027733
PCT Pub. Date: Feb. 18, 2021

(65) Prior Publication Data
US 2022/0364628 A1  Nov. 17, 2022

(30) Foreign Application Priority Data
Aug. 9, 2019 (CN) .......................... 201910734829.7

(51) Int. Cl.
*F16F 15/14* (2006.01)
*F16H 45/02* (2006.01)

(52) U.S. Cl.
CPC ...... *F16F 15/1407* (2013.01); *F16D 2300/22* (2013.01); *F16H 2045/0263* (2013.01)

(58) Field of Classification Search
CPC ...... F16F 15/14; F16F 15/1407; F16F 15/145; F16F 15/30; F16F 15/315; F16H 45/02; F16H 2045/0263; F16D 2300/22
See application file for complete search history.

(56) References Cited

U.S. PATENT DOCUMENTS

| 9,133,905 B2 * | 9/2015 | Schierling ............. F16F 15/145 |
| 10,550,912 B2 * | 2/2020 | Ishibashi ............... F16F 15/145 |

(Continued)

FOREIGN PATENT DOCUMENTS

| CN | 102762887 A | * 10/2012 | ............ F16F 15/145 |
| CN | 107850177 A | 3/2018 | |

(Continued)

OTHER PUBLICATIONS

International Search Report dated Nov. 17, 2020 in PCT/CN2020/107870 (submitting English translation only), 2 pages.

*Primary Examiner* — Adam D Rogers
(74) *Attorney, Agent, or Firm* — Oblon, McClelland, Maier & Neustadt, L.L.P.

(57) ABSTRACT

A centrifugal pendulum includes a first support plate, being able to rotate around a rotation axis; a second support plate, facing the first support plate in the axial direction and fixed to the first support plate. A mass is disposed between the first support plate and the second support plate in the axial direction. The first support plate has a first protrusion extending axially, and the first protrusion is integrally formed with the first support plate and defines a first track. The mass has a through hole extending axially, and the through hole defines a second track. The first protrusion extends into said through hole such that the first track faces the second track in the radial direction. A roller is disposed between the first track and the second track in the radial direction, and is capable of rolling against the first track and the second track, such that the mass is able to move relative (Continued)

to the first and second support plates and apply a torque onto the first and second support plates. The present invention also discloses a torque transmitting device comprising the centrifugal pendulum and a vehicle.

19 Claims, 4 Drawing Sheets

(56) References Cited

U.S. PATENT DOCUMENTS

| | | | |
|---|---|---|---|
| 11,460,089 B2 * | 10/2022 | Ryoo | ................. F16F 15/1457 |
| 2018/0231098 A1 | 8/2018 | Güllük et al. | |

FOREIGN PATENT DOCUMENTS

| | | | |
|---|---|---|---|
| CN | 109210137 A | | 1/2019 |
| CN | 109563904 A | | 4/2019 |
| CN | 109642637 A | | 4/2019 |
| DE | 10 2016 124 908 A1 | | 6/2018 |
| DE | 10 2018 130 832 A1 | | 7/2019 |
| DE | 102019125879 A1 | * | 4/2021 |
| JP | 61-149635 A | | 7/1986 |
| JP | 2017-198335 A | | 11/2017 |
| JP | 2018-532088 A | | 11/2018 |

\* cited by examiner

CENTRIFUGAL PENDULUM, TORQUE TRANSMITTING DEVICE INCLUDING THE CENTRIFUGAL PENDULUM AND VEHICLE

TECHNICAL FIELD

The present application relates to a centrifugal pendulum. It also relates to a torque transmitting device including the centrifugal pendulum and a vehicle including the torque transmitting device.

BACKGROUND

In the power transmission system of a vehicle, a damper is usually disposed between the internal combustion engine and the gearbox to eliminate the inherent torsional vibration of the output of the internal combustion engine. Centrifugal pendulum is a common torsional vibration damper, which includes a support plate and a mass mounted on the support plate. When the torsion on the support plate fluctuates, the mass can swing relative to the support plate in a limited way and apply a fluctuating torque in the opposite direction to the support plate, so as to achieve the damping effect.

A conventional centrifugal pendulum comprises two masses located on either side of the support plate, the two masses fixed to each other by means of a connecting member. The connecting member passes through a through hole on the support plate. In order to restrain the movement of the masses along a predetermined path, it is necessary to form a track face with a specific profile on the connecting member and the through hole. In a centrifugal pendulum with such a structure, the masses protrude from both sides of the support plate, so it is necessary to pay special attention to the arrangement and the size of components on both sides of the centrifugal pendulum in order to avoid interfering with the rotation of the masses. Moreover, such a centrifugal pendulum needs separate connecting members, and the number of parts is large, leading to complicated processing and assembly.

Therefore, it is desired to provide a centrifugal pendulum with an improved structure to at least overcome many problems existing in the prior art.

SUMMARY

An object of the present invention is to simplify the structure and the assembly of the centrifugal pendulum.

In one aspect of the present invention, a centrifugal pendulum is provided, comprising a first support plate capable of rotating around a rotation axis; a second support plate facing the first support plate in the axial direction and fixed with the first support plate; and a mass disposed between the first support plate and the second support plate in the axial direction. The first support plate has a first protrusion extending axially, and the first protrusion is integrally formed with the first support plate and defines a first track; The mass has a through hole extending axially, and the through hole defines a second track; In addition, the first protrusion extends into said through hole so that the first track faces the second track in the radial direction. A roller is disposed between the first track and the second track in the radial direction, and is able to roll against the first track and the second track, so that the mass is able to swing relative to the first support plate and the second support plate in a plane perpendicular to the rotation axis and exert a torque on the first support plate and the second support plate. This torque can offset the torque vibration transmitted to the centrifugal pendulum.

According to this technical solution, the first protrusion defining the first track is integrally formed with the first support plate, and there is no need to separately process and assemble the components that specifically define the first track, which reduces the number of parts and simplifies the structure and assembly of the centrifugal pendulum. In addition, the mass is located between the two supporting plates, which prevents the mass from being exposed to the outside of the centrifugal pendulum, avoiding the interference between the mass and external components.

In some embodiments, the first support plate has a first recess recessed axially, and the first recess is disposed on the outer surface of the first support plate opposite to the first protrusion.

In some embodiments, the first support plate can be stamped and formed, and the first protrusion and the first recess are formed simultaneously. In this case, the protrusion and the recess can be integrally formed on the support plate through a simple stamping step, which simplifies the manufacturing of the support plate.

In some embodiments, the second support plate has a second protrusion axially extending towards the first protrusion, the second protrusion integrally formed with the second support plate, the second protrusion extending into said through hole, and the first protrusion and the second protrusion together defining said first track. The first protrusion and the second protrusion may have the same protrusion height to each form a half of the first track. In other embodiments, the first protrusion and the second protrusion may have different protrusion heights.

In some embodiments, the first support plate and the second support plate are fixed to each other at the first protrusion by a coupling member. In this case, the coupling member may be at least partially accommodated in the first recess corresponding to the first protrusion, thereby reducing the axial size of the centrifugal pendulum. The coupling member can be rivets, screws, weldments, etc.

In some embodiments, the second support plate has a second recess recessed axially, and the second recess is disposed on the outer surface of the second support plate opposite to the second protrusion. The first end of said coupling member can be accommodated in the first recess without extending beyond the outer surface of the first support plate, and the opposite second end of said coupling member can be accommodated in the second recess without extending beyond the outer surface of the second support plate. In this case, the outer surfaces of the first support plate and the second support plate are flush without any protruding portions, which can reduce the axial size of the centrifugal pendulum and avoid interference with other adjacent components.

In some embodiments, the first track has a first concave surface, the second track has a second concave surface, and the first concave surface and the second concave surface face each other, forming an eye-like shape. The roller is located between the first concave surface and the second concave surface, and can simultaneously roll against the surfaces of the first concave surface and the second concave surface. Therefore, the mass can swing relative to the first and second support plates at a circumferential distance substantially equal to the sum of circumferential widths of the first concave surface and the second concave surface.

In some embodiments, the first track may be located on the radially inner side of the first protrusion, and the second track may be located on the radially inner side of said through hole.

In some embodiments, the first track may be located on the radially outer side of the first protrusion, and the second track may be located on the radially outer side of said through hole.

In some embodiments, the first support plate has a third protrusion extending axially, and the third protrusion is integrally formed with the first support plate and defines a third track. The mass has another through hole extending axially, the another through hole being offset by an angle with said through hole in the circumferential direction and defines a fourth track. The third protrusion extends into said another through hole so that the third track faces the fourth track in the radial direction. In addition, another roller is disposed between the third track and the fourth track in the radial direction, and is able to roll against the third track and the fourth track, so that the mass is movable relative to the first support plate and the second support plate and exert a torque on the first support plate and the second support plate.

In this case, a first sliding arrangement consisting of the first track, the second track and the roller may be the same as a second sliding arrangement consisting of the third track, the fourth track and the another roller, and be offset by a certain angle with respect to the rotation axis. Therefore, the mass can swing more smoothly relative to the first and second support plates.

In another aspect of the present invention, a torque transmitting device is provided, including the centrifugal pendulum according to the above description. This centrifugal pendulum can reduce the torque vibration in the torque transmitting device and has a compact structure and simplified assembly.

In some embodiments, said torque transmitting device may be a torque converter, a clutch device or a dual-mass flywheel.

In yet another aspect of the present invention, a vehicle is provided, including the torque transmitting device according to the above description.

DETAILED DESCRIPTION OF THE EMBODIMENTS

Figure 1:
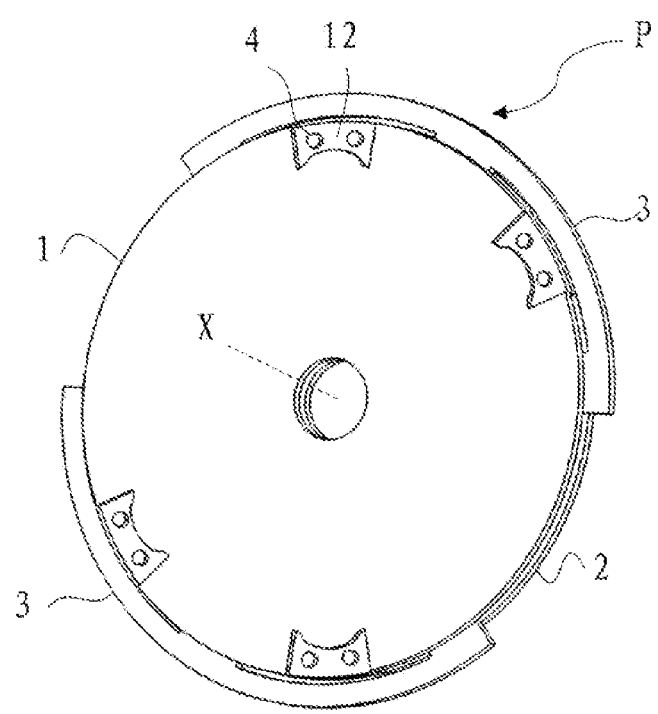
FIG. 1 is an overall perspective view of a centrifugal pendulum according to a first embodiment.

The specific embodiments of the present invention will be described in detail below with reference to the accompanying drawings. Components with the same and similar reference numerals in the drawings have the same or similar functions.

In the following description, "axial direction" refers to the direction parallel to the rotation axis X of the centrifugal pendulum P; "circumferential direction" refers to the circumferential direction around the rotation axis X; "radial direction" refers to the direction perpendicular to the rotation axis X, wherein "outward" and "outside" and so on refer to the direction radially outward away from the rotation axis X, and "inward" and "inside" refer to the direction radially inward towards the rotation axis X.

As shown in FIG. 1, the centrifugal pendulum P according to the present invention includes a first support plate 1 and a second support plate 2, the two facing each other in the axial direction and being fixed to each other. A mass 3 is disposed between the first support plate 1 and the second support plate 2 in the axial direction.

The two first support plate 1 and second support plate 2 may have a disk shape, with the same diameter and are overlapped. The centers of the first support plate 1 and the second support plate 2 are provided with through holes for assembling a rotation shaft. The rotation shaft receives a torque from a internal combustion engine and drives the first support plate 1 and the second support plate 2 to rotate around the rotation axis X passing through the centers.

In other embodiments, the first support plate 1 and the second support plate 2 may have other suitable shapes (e.g., rings). In addition, the first support plate 1 and the second support plate 2 can be coupled (e.g., riveted) to the rotating disk body of an existing device (e.g., the turbine disk of a torque converter).

Two groups of masses 3 may be disposed between the first support plate 1 and the second support plate 2, the two groups of masses 3 arranged near the circumferential edges of the first support plate 1 and the second support plate 2 and symmetrical about the rotation axis X. In other embodiments, a plurality of groups of masses with other numbers of groups can be provided, such as three groups, four groups, etc., said plurality of groups of masses are uniformly arranged around the rotation axis X. Each group of masses 3 may have a fan-ring shape, that is, it has an inner arc edge extending for an angle and an outer arc edge extending for the same angle. In other embodiments, other shapes of masses can be provided.

Figure 2:
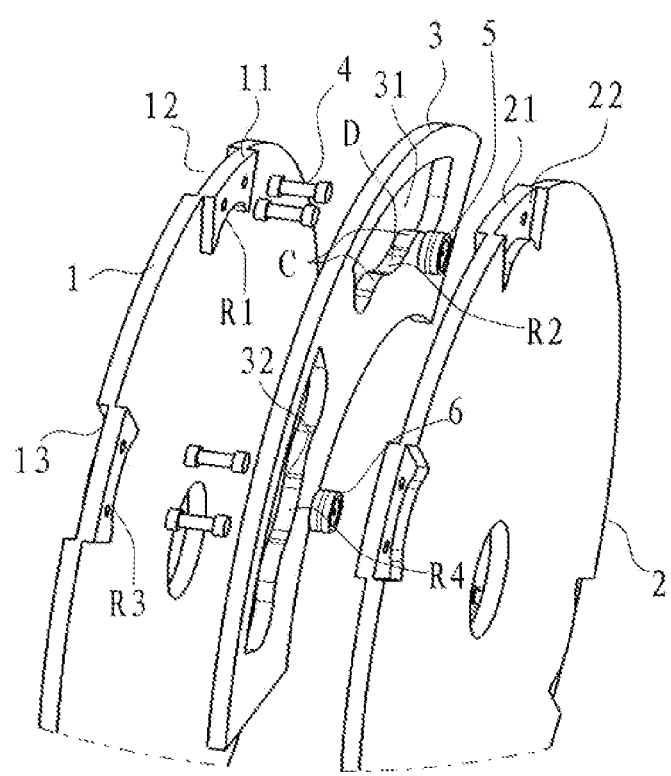
FIG. 2 is a partial exploded perspective view of the centrifugal pendulum according to the first embodiment.

FIG. 2 shows the structures of the first support plate 1, the second support plate 2 and the mass 3.

The first support plate 1 has a first protrusion 11 extending axially, and the first protrusion 11 is integrally formed with the first support plate 1. The second support plate 2 has a second protrusion 21 extending axially towards the first protrusion 11, and the second protrusion 21 is integrally formed with the second support plate 2. The first protrusion 11 and the second protrusion 21 together define a first track R1. The mass 3 has a through hole 31 extending axially, and the through hole 31 defines a second track R2. The first protrusion 11 and the second protrusion 12 both extend into said through hole 31, so that the first track R1 faces the second track R2 in the radial direction.

A roller 5 is disposed between the first track R1 and the second track R2 in the radial direction, and is able to roll against the first track R1 and the second track R2, so that the mass 3 is able to swing within a certain circumferential distance relative to the first support plate 1 and the second support plate 2, during the swing, the mass 3 applying a torque onto the first support plate 1 and the second support plate 2 via the roller 5 to offset the torque fluctuation on the first support plate 1 and the second support plate 2.

Particularly, the support plates 1 and 2 of the present invention are each stamped and formed, so that the first protrusion 11 and the second protrusion 12 thereon are integrally formed. Take the first support plate 1 as an example. In the stamping process, a part of the material of the first support plate 1 advances towards the side of the mass 3 for a certain distance, while maintaining a firm connection with the rest of the material of the support plate 1. Thereby, the first protrusion 11 with a certain circumferential height is formed on the inner surface of the support plate 1; Accordingly, a first recess 12 with a certain circumferential depth is formed on the outer surface of the first support plate 1 and on the back surface of the first protrusion 11.

The assembly operation of the centrifugal pendulum P is as follows:

First, align the two support plates 1, 2 and the mass 3 so that the first protrusion 11 and the second protrusion 21 are both aligned with the corresponding through hole 31, and place the roller 5 between the second track R2 on the through holes 31 of the first track R1 on the first protrusion 11 and the second protrusion 21, as shown in f=FIG. 2;

second, push the two support plates 1 and 2 axially, so that the first protrusion 11 and the second protrusion 21 extend into the inside of the through hole 31 and are in contact with each other, so that the inner and outer edges of the roller 5 contact the first track R1 and the second track R2 respectively;

third, rivet the two protrusions 11 and 21 together with rivets 4, thereby the two support plates 1 and 2 are riveted together.

Since the sum of the heights of the two protrusions 11 and 21 is larger than the depth of the through hole 31 (i.e., the thickness of the mass 3), there is an axial gap between the assembled support plates 1 and 2 and the mass 3, allowing the mass 3 to swing relative to the support plates 1 and 2 in a plane perpendicular to the rotation axis X.

According to the present invention, since the supporting plates 1 and 2 and the protrusions 11 and 21 thereon are integrated, the centrifugal pendulum P of the present invention reduces the number of parts and thus simplifying the assembly operation compared with the case where the first track R1 is provided by separate parts.

In addition, the two ends of the rivet 4 can be accommodated in the first recess 12 and the second recess 22 on the outer surfaces of the two support plates 1 and 2, respectively, and preferably do not extend beyond the respective outer surfaces of the support plates 1 and 2. In this case, there are no protruding portions on the outer surfaces of the support plates 1 and 2, which helps to reduce the axial distance of the centrifugal pendulum 3 and avoid interference with other adjacent components. In other embodiments, other coupling members 4 such as screws and weldments can also be used to fix the two supporting plates 1 and 2, and the coupling members can also protrude from the outer surfaces of the supporting plates 1 and 2.

In the embodiment shown in FIG. 2, the heights of the first protrusion 11 and the second protrusion 21 are the same, the two respectively defining a half of the first track R1. In other embodiments which are not shown, the heights of the first protrusion 11 and the second protrusion 21 may also be different. Even, the second protrusion 21 may not be formed, and only the first protrusion 11 is used to form the first track R1. At this time, the height of the first protrusion 11 is approximately equal to the depth of the through hole 31, and the first protrusion 11 itself is fixedly coupled to the second support plate 2.

In addition, in order to make the swing of the mass 3 smoother, another through hole 32 may be formed in the mass 3. As shown in FIG. 2, the through holes 31 and 32 have exactly the same geometric structure, and they are offset by an angle in the circumferential direction. In this case, the first support plate 1 has a third protrusion 13 extending axially, and the third protrusion 13 is integrally formed with the first support plate 1 and defines a third track R1. The additional another through hole 32 defines a fourth track R4. The third protrusion 13 extends into said another through hole 32 so that the third track R3 faces the fourth track R4 in the radial direction. Also, another roller 6 is disposed between the third track R3 and the fourth track R4 in the radial direction and is able to roll against the third track R3 and the fourth track R4. In this case, the mass 3 swings relative to the first support plate 1 and the second support plate via the two rollers 5 and 6 at the same time, and simultaneously applies a torque via the two rollers 5 and 6. Since the two rollers 5 and 6 are disposed in the front and the rear in the swinging direction, it may facilitate a smoother rotation of the mass 3 relative to the rotating plates 1 and 2. In other embodiments, other numbers (for example, three) of through holes can also be provided for each mass 3.

For the arrangement of the first track R1 and the second track R2, the present invention proposes the following two embodiments.

The First Embodiment

Figure 3:
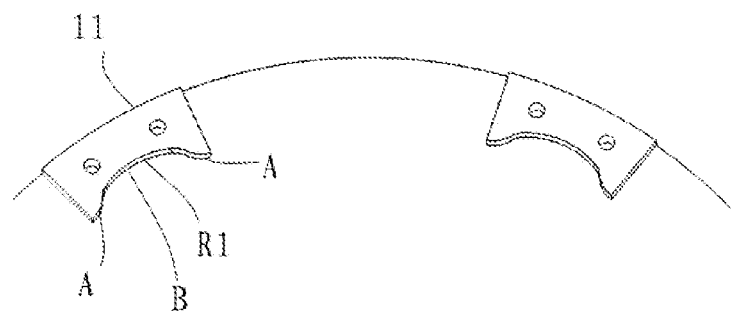
FIG. 3 is a partial view of the support plate of the centrifugal pendulum according to the first embodiment.

FIGS. 1 to 3 show a centrifugal pendulum P according to the first embodiment. As shown in FIG. 3, taking the protrusion 11 of the first support plate 1 as an example, each protrusion 11 is formed next to the outer periphery of the first support plate 1, that is, the outer edge of each protrusion 11 is a portion of the outer peripheral edge of the first support plate 1. In addition, the radially inner edge of each protrusion 11 defines a first track R1 with a specific profile for contacting the radially outer side of the roller 5 and guiding the rolling of the roller 5. The inner and outer edges of each protrusion 11 are connected at both sides through two radial side edges. The protrusions on the first support plate 1 and the second support plate 2 have the same structure.

As shown in FIG. 2, taking the first through hole 31 as an example, the radially outer edge of each through hole 31 is arc-shaped for contacting the radially outer edge of the first protrusion 11 and the second protrusion 21 extending into the through hole 31; Accordingly, the outer edges of the first protrusion 11 and the second protrusion 21 can bear the mass 3 and guide it to swing in the circumferential direction. The radially inner edge of the through hole 31 defines a second track R2 with a specific profile for contacting the radially inner side of the roller 5 and guiding the rolling of the roller 5. The inner edge and the outer edge of the through hole 31 are connected on both sides through two radial side edges.

In operation, if the torque on the supporting plates 1 and 2 fluctuates, the mass 3 can swing relative to the supporting plates 1 and 2 in the circumferential direction and radial direction according to the pre-designed path through the cooperation of the roller 5, the first track R1 and the second track R2, during which the mass 3 exerts a torque on the support plates 1 and 2 in the opposite direction via the roller 5, so as to offset the torque fluctuation on the supporting plates 1 and 2.

FIGS. 2 and 3 show exemplary profiles of the first track R1 and the second track R2. The first track R1 has first and second convex surfaces A protruding radially inward, and a first concave surface B recessed radially outward is defined between the first and second convex surfaces A. The second track R2 has third and fourth convex surfaces C protruding radially outward, and a second concave surface D recessed radially inward is defined between the third and fourth convex surfaces C. The roller 5 is located between the first concave surface B and the second concave surface D. During the swinging process of the mass 3, the roller 5 rolls along the surfaces of the first concave surface B and the second concave surface D, and the action force is transmitted on the contact lines of the roller 5 with the first concave surface B and the second concave surface D, generating the fluctuating torque in the opposite direction.

In addition, as shown in FIG. 2, in the mass 3, a side concave surface that is recessed radially inward is defined between the third and fourth convex surfaces C and the adjacent side edges of the through holes, respectively, which can prevent the first and second convex surfaces A of the first track R1 from interfering with the surface of the second track R2 during swinging.

In some embodiments, vibration damping elements such as rubber pads can be disposed at two sides of the through hole 31 of the mass 3 and/or at two sides of the protrusions 11 and 21 of the support plates 1 and 2 for reducing the impact generated when the mass 3 contacts the support plates 1 and 2.

The Second Embodiment

Figure 4:
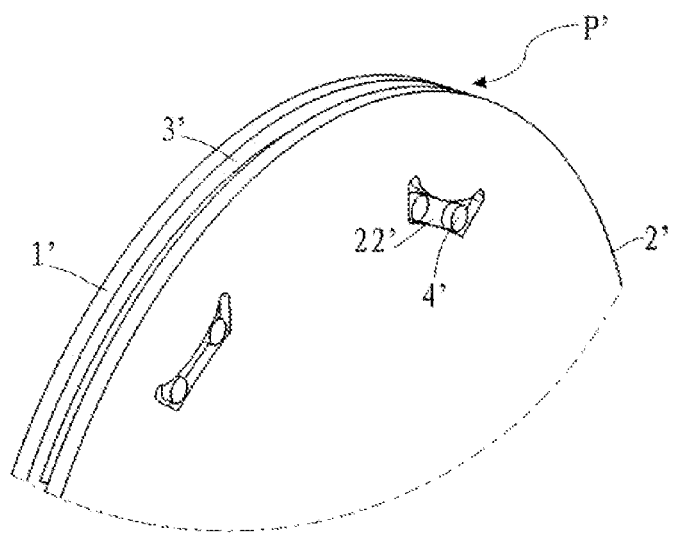
FIG. 4 is a partial perspective view of a centrifugal pendulum according to the second embodiment.
Figure 5:
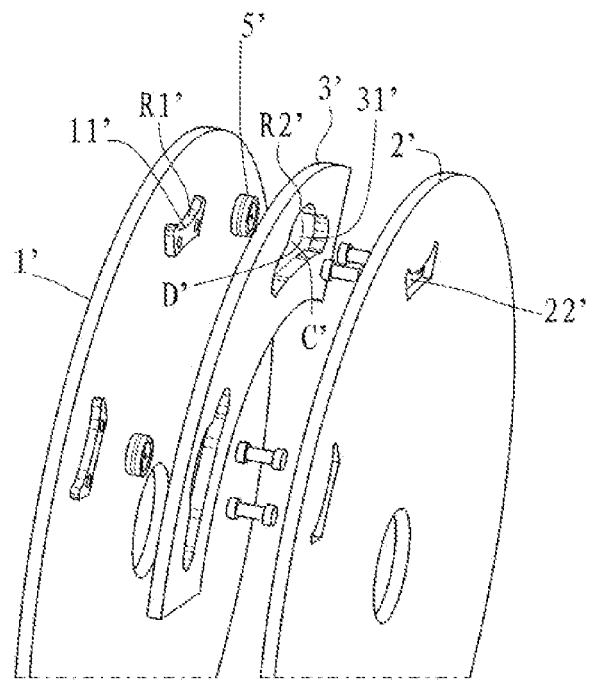
FIG. 5 is a partial exploded perspective view of a centrifugal pendulum according to the second embodiment.
Figure 6:
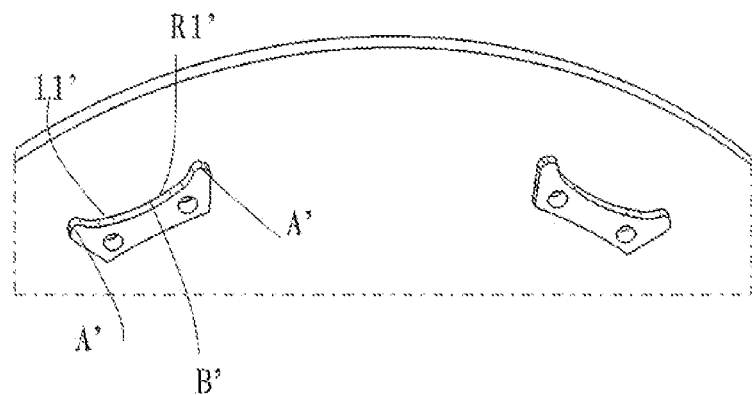
FIG. 6 is a partial view of the support plate of the centrifugal pendulum according to the second embodiment.

FIGS. 4 to 6 show the centrifugal pendulum P' according to the second embodiment. This centrifugal pendulum P' is basically the same as the centrifugal pendulum P of the first embodiment, and only the differences between the two will be described below.

In the second embodiment, as shown in FIG. 6, taking the first protrusions 11' of the first support plate 1' as an example, each protrusion 11' is formed away from the outer periphery of the first support plate 1', that is, the radially outer edge of the protrusion 11' is spaced apart from the outer peripheral edge of the support plate 1' by a certain distance. In addition, the radially outer edge of each protrusion 11' defines a first track R1' with a specific profile for contacting the radially inner side of the roller 5' and guiding the rolling of the roller 5'.

As shown in FIG. 5, the radially inner edge of the through hole 31' is arc-shaped for contacting the radially inner edge of the protrusion 11' extending into the through hole 31'; Accordingly, the radially inner edge of the protrusion 11' can bear the mass 3' and guide it to swing in the circumferential direction. The radially outer edge of the through hole 31' defines a second track R2' with a specific profile for contacting the outer side of the roller 5' and guiding the rolling of the roller 5'.

In operation, if the torque on the support plates 1' and 2' fluctuates, the mass 3' can swing relative to the support plates 1' and 2' in the circumferential direction and radial direction according to the pre-designed path through the cooperation of the rollers 5', the first track R1' and the second track R2', during which the mass 3' exerts a torque in the opposite direction on the support plates 1' and 2', so as to offset the torque fluctuation on the support plate 1' and 2'.

FIGS. 5 and 6 show exemplary profiles of the first track R1' and the second track R2'. The first track R1' has first and second convex surfaces A' protruding radially outward, and a first concave surface B' recessed radially inward is defined between the first and second convex surfaces A'. The second track R2' has third and fourth convex surfaces C' protruding radially inward, and a second concave surface D' recessed radially outward is defined between the third and fourth convex surfaces C'. The roller 5' is located between the first concave surface B' and the second concave surface D'. During the swinging process of the mass 3', the roller 5' rolls along the surfaces of the first concave surface B' and the second concave surface D' at the same time, and the action force is transmitted on the contact lines of the roller 5' with the first concave surface B' and the second concave surface D', generating the fluctuating torque in the opposite direction.

A torque transmitting device according to the present invention includes the centrifugal pendulum described above. The torque transmitting device can be a torque converter, a clutch device or a dual-mass flywheel. The centrifugal pendulum can reduce torque fluctuation transmitted from the internal combustion engine to the torque converter, the clutch device or the dual-mass flywheel.

A vehicle according to the present invention includes the torque transmitting device described above. The vehicle is for example an automobile, an engineering vehicle, an agricultural vehicle and the like. This torque transmitting device can provide damping effect to eliminate the torque vibration generated by the internal combustion engine of the vehicle. This is beneficial to save fuel consumption, reduce noise and improve vehicle reliability.

Some best embodiments and other embodiments for realizing the present utility model have been described in detail above, but it should be understood that these embodiments only serve as examples and do not limit the scope, application or construction of the utility model in any way. The scope of protection of the present utility model is limited by the appended claims and their equivalents. Those skilled in the art can make many changes to the aforementioned embodiments under the teaching of present utility model, and all of the changes fall within the scope of protection of the present utility model.

LIST OF REFERENCE NUMBERS

P, P' centrifugal pendulum
1, 1' first support plate
11, 11' first protrusion
12 first recess
13 third protrusion
2, 2' second support plate
21 second protrusion
22, 22' second recess
3, 3' mass
31, 31' through hole
32 another through hole
4, 4' coupling member, rivet
5, 5' roller
6 another roller
R1, R1' first track
A, A' first and second convex surface
B, B' first concave surface
R2, R2' second track
C, C' third and fourth convex surface
D, D' second concave surface
R3 third track
R4 fourth track

What is claimed is:
1. A centrifugal pendulum including:
a first support plate being rotatable about a rotation axis;
a second support plate facing the first support plate in an axial direction and being fixed to the first support plate; and a mass disposed between the first support plate and the second support plate in the axial direction;

wherein the first support plate has a first protrusion extending axially, and the first protrusion is integrally formed with the first support plate and defines a first track;

wherein the mass has a through hole extending axially, and the through hole defines a second track;

wherein the first protrusion extends into the through hole such that the first track faces the second track in a radial direction; and wherein a roller is disposed between the first track and the second track in the radial direction, and is capable of rolling against the first track and the second track, such that the mass is movable relative to the first support plate and the second support plate and can apply a torque onto the first support plate and the second support plate.

2. The centrifugal pendulum according to claim 1, wherein the first support plate has a first recess being axially recessed, and wherein the first recess is disposed on an outer surface of the first support plate opposite to the first protrusion.

3. The centrifugal pendulum according to claim 2, wherein the first support plate is stamped to form the first protrusion and the first recess simultaneously.

4. The centrifugal pendulum according to claim 2, wherein the first support plate and the second support plate are fixed to each other at the first protrusion by a coupling member.

5. The centrifugal pendulum according to claim 2, wherein the first track has a first concave surface and the second track has a second concave surface, and wherein the roller is located between the first concave surface and the second concave surface.

6. The centrifugal pendulum according to claim 2, wherein the first support plate has a third protrusion extending axially, and the third protrusion is integrally formed with the first support plate and defines a third track;

wherein the mass has another through hole extending axially, and said another through hole is offset from the through hole by an angle in a circumferential direction, and said another through hole defines a fourth track;

wherein the third protrusion extends into said another through hole such that the third track faces the fourth track in the radial direction; and wherein another roller is disposed between the third track and the fourth track in the radial direction and is capable of rolling against the third track and the fourth track.

7. A torque transmitting device including the centrifugal pendulum according to claim 2.

8. The centrifugal pendulum according to claim 1, wherein the second support plate has a second protrusion extending axially toward the first protrusion, and the second protrusion is integrally formed with the second support plate; and wherein the second protrusion extends into the through hole, and the first protrusion and the second protrusion together define the first track.

9. The centrifugal pendulum according to claim 8, wherein the second support plate has a second recess being axially recessed, and the second recess is disposed on an outer surface of the second support plate opposite to the second protrusion.

10. The centrifugal pendulum according to claim 8, wherein the first protrusion and the second protrusion have same protrusion heights such that each of the first protrusion and the second protrusion forms a half of the first track.

11. The centrifugal pendulum according to claim 1, wherein the first support plate and the second support plate are fixed to each other at the first protrusion by a coupling member.

12. The centrifugal pendulum according to claim 1, wherein the first track has a first concave surface and the second track has a second concave surface, and wherein the roller is located between the first concave surface and the second concave surface.

13. The centrifugal pendulum according to claim 12, wherein the first track is located at a radially inner side of the first protrusion, and the second track is located at a radially inner side of the through hole.

14. The centrifugal pendulum according to claim 12, wherein the first track is located at a radially outer side of the first protrusion, and the second track is located at a radially outer side of the through hole.

15. The centrifugal pendulum according to claim 1, wherein the first support plate has a third protrusion extending axially, and the third protrusion is integrally formed with the first support plate and defines a third track;

wherein the mass has another through hole extending axially, and said another through hole is offset from the through hole by an angle in a circumferential direction, and said another through hole defines a fourth track;

wherein the third protrusion extends into said another through hole such that the third track faces the fourth track in the radial direction; and wherein another roller is disposed between the third track and the fourth track in the radial direction and is capable of rolling against the third track and the fourth track.

16. A torque transmitting device including the centrifugal pendulum according to claim 1.

17. The torque transmitting device according to claim 16, wherein the torque transmitting device is a torque converter, a clutch device or a dual mass flywheel.

18. A vehicle including the torque transmitting device according to claim 17.

19. A vehicle including the torque transmitting device according to claim 16.

* * * * *